United States Patent
Cooper et al.

(10) Patent No.: US 6,446,153 B2
(45) Date of Patent: Sep. 3, 2002

(54) SHARED EMBEDDED MICROCONTROLLER INTERFACE

(75) Inventors: Barnes Cooper, Hillsboro, OR (US); James Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 08/818,048

(22) Filed: Mar. 14, 1997

(51) Int. Cl.[7] .................................................. G06F 9/46
(52) U.S. Cl. ...................................................... 710/260
(58) Field of Search ................................ 710/260–269, 710/104; 713/1–100, 300–340

(56) References Cited

U.S. PATENT DOCUMENTS 5,903,894 A * 5/1999 Reneris ........................ 707/100
5,937,200 A * 8/1999 Frid et al. ..................... 710/264

OTHER PUBLICATIONS

Advanced Configuration and Power Interface Specification Revision 1.0 Dec. 22, 1996.*

* cited by examiner

Primary Examiner—Paul R. Myers
(74) Attorney, Agent, or Firm—Kenyon & Kenyon

(57) ABSTRACT

A computer system is described where one or more processors executing operating system (OS) code and System Management (SM) code can access the same host interface of an embedded controller. The embedded controller, in turn, is coupled to one or more system devices such as an IDE power plane switch, a thermal A/D monitor, a System Management Bus (SMBus), etc. The embedded controller asserts a system management interrupt (SMI) to the system management environment of the processing unit(s) as well as a system control interrupt to the operating system environment of the processing unit(s). Accordingly, the processing unit(s) executing operating system code and system management code is able to control and/or monitor a number of system devices in the computer system by communicating with the embedded controller via its host interface and interrupts.

18 Claims, 6 Drawing Sheets

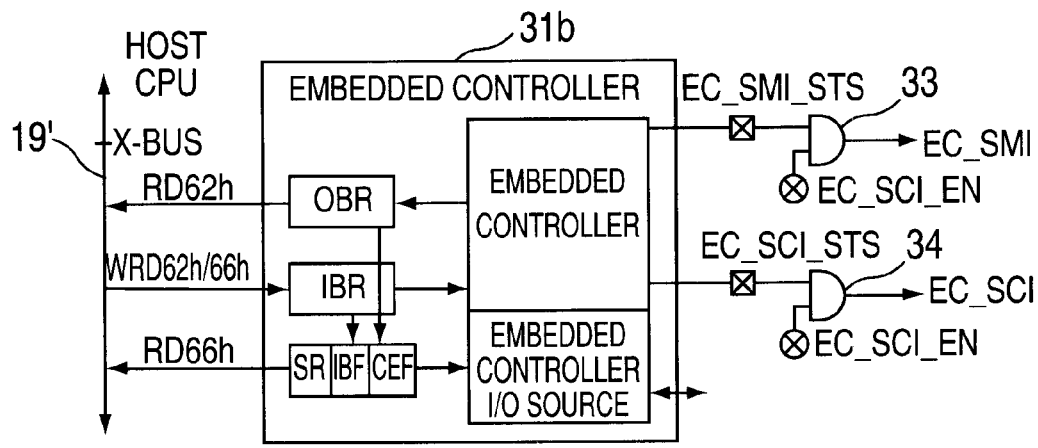
FIG. 3
| BIT7 | BIT6 | BIT5 | BIT4 | BIT3 | BIT2 | BIT1 | BIT0 |
|------|------|------|------|------|------|------|------|
| IGN | SMI EVT | SCI EVT | BURST | CMD | IGN | IBF | OBF |
FIG. 5
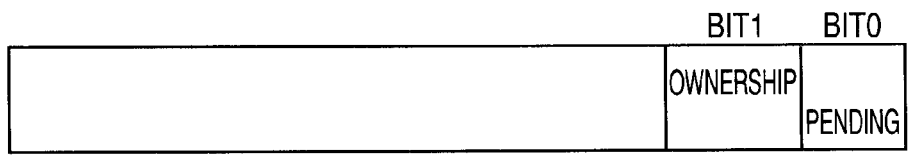
FIG. 6

SHARED EMBEDDED MICROCONTROLLER INTERFACE

BACKGROUND OF THE INVENTION

The present invention pertains to a shared embedded microcontroller interface, and more particularly, to an interface with an embedded controller that is shared between a system management environment and an operating system environment.

Embedded controllers are used extensively in mobile computer designs, and are becoming increasingly more prevalent in desktop and server designs, as well. Embedded controllers were initially used as standard Personal Computer (PC) architecture keyboard controllers. Eventually, these keyboard controllers were modified to add numerous features for use with the System Management Mode (SMM) of the microprocessors designed and manufactured by Intel Corporation, Santa Clara, Calif. A description of the operation of System Management Mode software for power management can be found at pages 1–228 to 1–289 of the publication "Peripheral Components," 1996 by Intel Corporation, the disclosure of which is hereby incorporated by reference in its entirety. Referring to FIG. 1, a computer system 10 is shown which includes such a microcontroller. A central processing unit (CPU) 11 is provided, such as a Pentium® microprocessor from Intel Corporation, Santa Clara, Calif. The CPU 11 is coupled to a first bridge circuit 13 (also referred to as a host bridge or north bridge), which in turn is coupled to a bus 15, such as a bus operated according to the Peripheral Component Interconnect (PCI) architecture (Version 2.1, 1995, PCI Special Interest Group, Portland, Oreg.). The first bridge circuit 13 is also coupled to memory 14. Coupled to the PCI bus 15 is a second bridge circuit 17 (also called a south bridge), which in turn can be coupled to an extension bus 19. An embedded controller 21 of the type mentioned above can be coupled to the extension bus 19. An enhanced version of this embedded controller 21 may include a family of parts and a high performance CPU core with upwards of one hundred general purpose input-output pins.

The embedded controller 21 includes a host interface. Often, this host interface is one byte wide and allows real-time communication with the CPU 11. Typically, two address ranges are decoded at the host interface: 60H/64H (hexadecimal) for standard keyboard functionality and 62H/66H for system management activities. Embedded controllers in mobile environments are typically coupled to a plurality of system devices (e.g., battery 22a and IDE power plane switch 22b) and are responsible for a large amount of monitoring and control activities including, but not limited to function key System Management Interrupt (SMI) generation, thermal management, battery management, switch management, power plane control, suspend sequencing, etc. In these systems, communication between the CPU 11 and the controller 21 may occur through the use of an interrupt (e.g., an SMI). In the system shown in FIG. 1, the controller 21 places data in an addressable register and then asserts an interrupt to the CPU 11. The interrupt is handled by the execution of system management code that can be stored in the memory 14. Accordingly, in response to the interrupt, the CPU 11 suspends its current processing and responds to the interrupt to handle the appropriate operation based on the value placed in the addressable register by the controller 21.

As an example, the embedded controller 21 can be used to monitor a battery 22a which supplies power to the computer system 10. If the battery supply is nearing depletion, that condition is sensed by the embedded controller 21 which places the appropriate byte in its output register and alerts the CPU 11 by asserting the System Management Interrupt. In response, the CPU 11 suspends its current processing and executes system management code. During the execution of the SM code, the output register of the embedded controller is read by the CPU 11 and appropriate actions are taken (e.g., alert the user by displaying a message indicating battery supply depletion). The CPU 11 can also execute system management code to control a system device coupled to the embedded controller 21, such as an IDE power plane switch 22b. During execution of system management code, the CPU 11 writes a command to an input register of the embedded controller 21. In response to the command, the embedded controller 21 controls the operation of the IDE power plane switch 22b (e.g., disconnects a device from the IDE power plane in order to reduce power consumption).

If the execution of operating system code in the CPU 11 or other processing unit were to take over some of the aforementioned communication with the embedded controller 21 to obtain important power management information (battery, power plane control, thermal control, suspend switches, etc.) and to receive important power management events when they occur (e.g., low battery warning, A.C. adapter insertion, etc.), the embedded controller 21 will not also be able to efficiently communicate with the SM handler (i.e., the CPU 11 executing system management code in the example of FIG. 1) to process special events such as the depression of functions keys at the keyboard. Accordingly, there is a need for a method and apparatus to allow for an embedded controller to interface with what could be a multi-tasking, multi-processing operating system as well as being shared by the execution of system management code.

SUMMARY OF THE INVENTION

The present invention provides an embedded controller that can interface with both an operating system and a system management code. According to an embodiment of the present invention, a computer system is provided having a central processing unit (or two or more processing units) adapted to execute operating system code stored in a first memory area and system management code stored in a second memory area. An embedded controller having a host interface is coupled to the central processing unit via the host interface and first and second interrupts. The first interrupt is used by the central processing unit during the execution of the operating system code and the second interrupt is used by the central processing unit during the execution of the system management code. The embedded controller is additionally coupled to at least one system device in the computer system and the central processing unit communicates with the embedded controller via the host interface and the first and second interrupts while executing the operating system code and the system management code. Accordingly, the central processing unit is capable of monitoring and/or controlling the system device via communication with the embedded controller.

BRIEF DESCRIPTION OF THE DRAWINGS

FIG. 3 is a block diagram of the embedded controller constructed according to the present invention.

FIG. 5 depicts the status register used in the embedded controller of FIG. 3.

FIG. 6 depicts a register that can be used to arbitrate access to the embedded controller of FIG. 3 by the operating system and system management environments.

DETAILED DESCRIPTION

Figure 1:
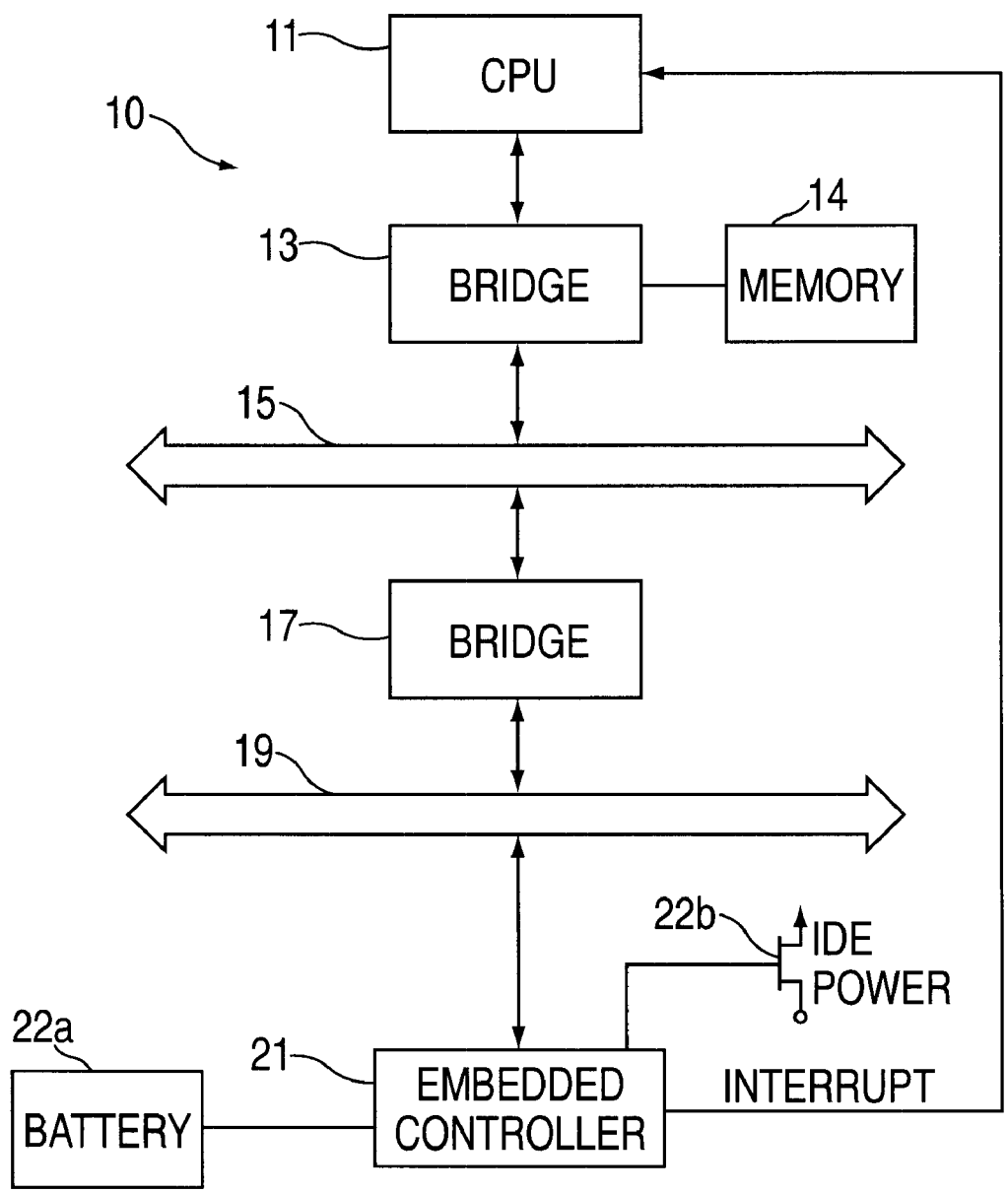
FIG. 1 is a block diagram of a computer system including an embedded controller as is known in the art.
Figure 2:
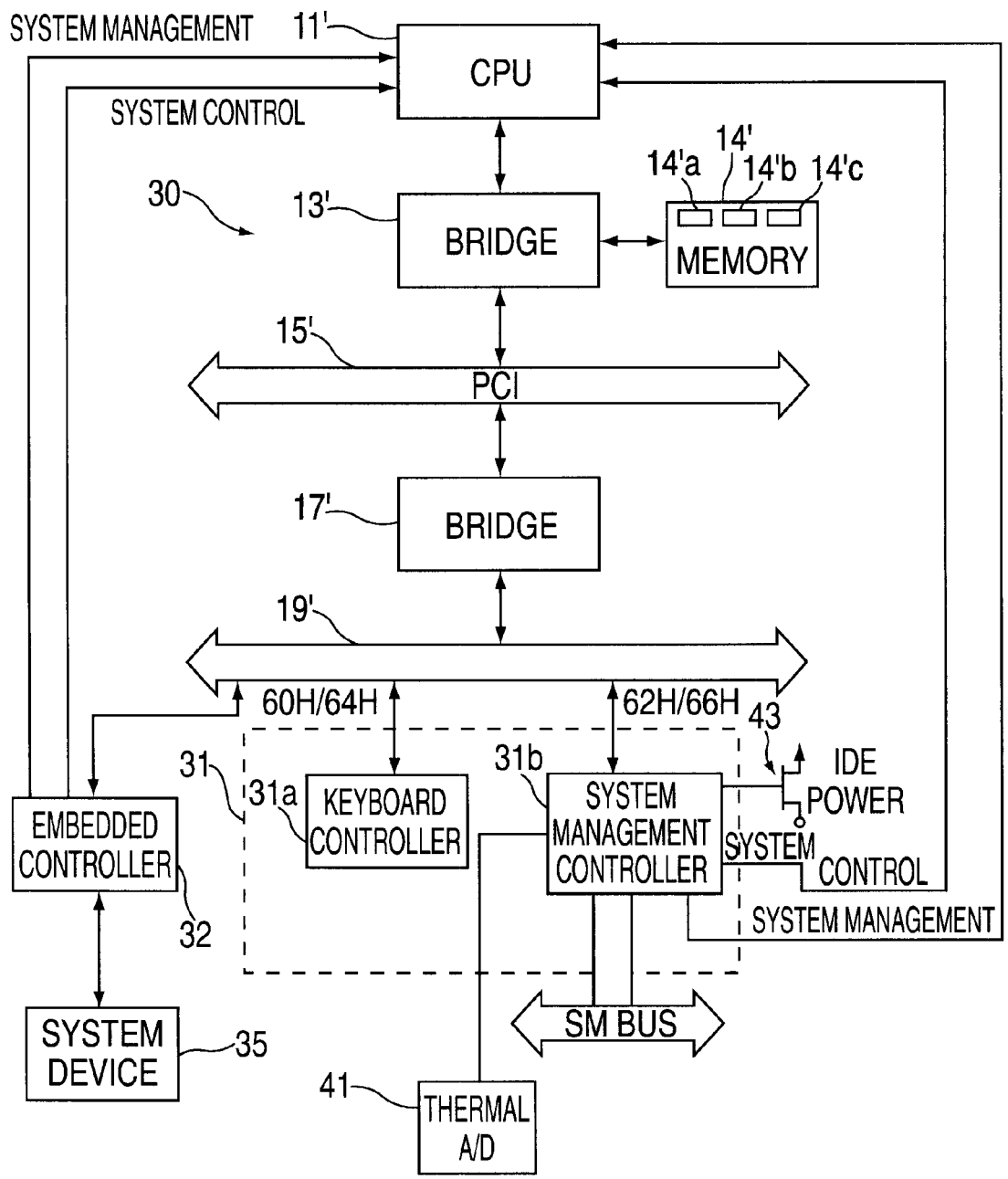
FIG. 2 is a block diagram of a computer system incorporating the features of the present invention.

Referring to FIG. 2, a block diagram of a computer system 30 incorporating the features of the present invention is shown. As in FIG. 1, a CPU 11' is provided coupled to a PCI bus 15' via a first bridge circuit 13'. An extension bus 19' is coupled to the PCI bus 15' via a second bridge circuit 17'. Elements 11', 13', 15', 17', and 19' in FIG. 2 are similar in operation to the corresponding components in FIG. 1. A memory device 14', such as Random Access Memory (RAM) or the like, can be coupled to the first bridge circuit 13' and can store system management code in a first memory area 14'a and operating system code in a second memory area 14'b. One skilled in the art will appreciate that the system management code and operating system code can be stored in separate memory devices as well as in different types of memory devices (i.e., Read Only Memory (ROM), magnetic disk, etc.). Coupled to the extension bus 19' is an embedded controller (or embedded microcontroller) 31. According to an embodiment of the present invention, the embedded microcontroller 31 includes a system management controller 31b. Additionally, the embedded controller 31 may also include a keyboard controller 31a. The keyboard controller 31a is addressed by 60H and 64H and the system management controller 31b is addressed by 62H and 66H. One skilled in the art will appreciate that the embedded controller 31 can also be a single component integrating the keyboard controller 31a and the system management controller 31b. An H-8 microcontroller manufactured by Hitachi, Ltd. can be used as the embedded controller 31. A description of such an embedded microcontroller can be found in section 13 (ACPI Embedded Controller Interface Specification) of "Advanced Configuration and Power Interface Specification," Draft Revision 1.0, Dec. 22, 1996, by Intel Corporation et alia, the disclosure of which is hereby incorporated by reference.

Figure 7:
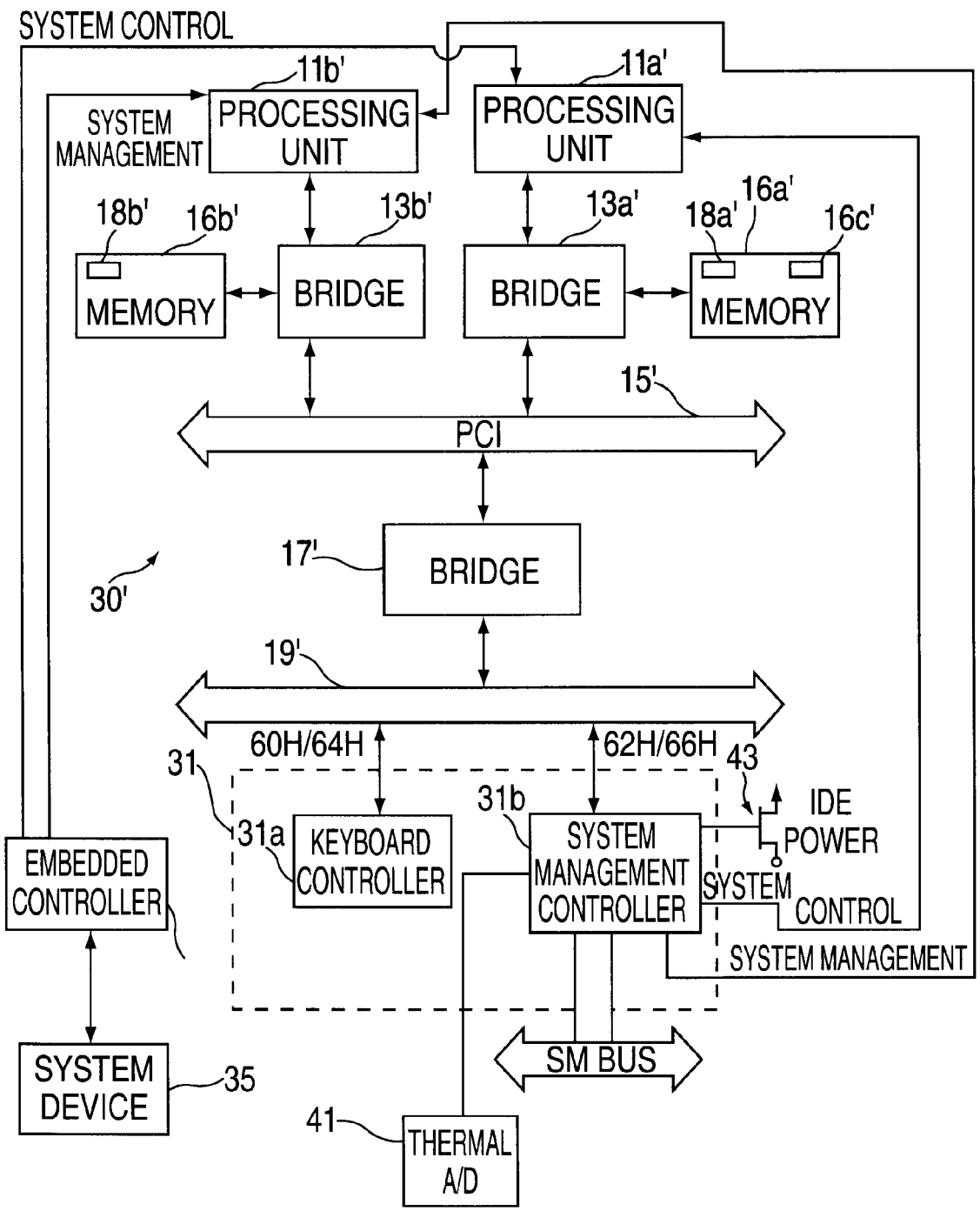
FIG. 7 is a block diagram of the computer system of FIG. 2 having two processing units.

The system management controller 31b asserts first and second interrupts to the CPU 11': a system control interrupt (SCI) and a system management interrupt (SMI). Referring to FIG. 3, a block diagram of the interface for the system management controller 31b is shown. The system management controller 31b outputs an SMI (labeled "EC_SMI" in FIG. 3) and an SCI (labeled "EC_SCI" in FIG. 3) to the CPU 11'. The status of the SMI interrupt can be checked at "EC_SMI_STS" and the status of the SCI interrupt can be checked at "EC_SCI_STS." Also, an enable feature is added to the generation of these interrupts by providing AND gates 33 and 34 which have the SMI and SCI interrupts as inputs, respectively, along with enable signals "EC_SMI_EN" and "EC_SCI_EN," respectively. These enable signals can be controlled by the CPU 11' executing operating system code, for example. Referring to FIG. 7, a computer system 30' is shown where more than one processing unit can be provided for executing operating system and system management code. In FIG. 7, a first processing unit 11a' is provided coupled to a bridge circuit 13a' and memory 16a which stores operating system code in a first memory area 18a'. A second processing unit 11b' is provided coupled to a bridge circuit 13b' and memory 16b' which stores system management code in a second memory area 18b'. Accordingly, in this embodiment, at least the first processing unit 11a' receives the SCI interrupt and at least the second processing unit 11b' receives the SMI interrupt. Also, one or more additional embedded controllers can be coupled to the computer systems 30 and 30' of FIGS. 2 and 7. For example, an additional embedded controller 32 can be coupled to the extension bus 19' that controls and or monitors one or more system devices (e.g., an additional system device 35). In FIG. 2, the additional embedded controller 32 supplies the SCI and SMI interrupts to the central processing unit 11'. In FIG. 7, the additional embedded controller 32 supplies the SCI interrupt to processing unit 11a' and supplies the SMI interrupt to processing unit 11b'.

The system management controller 31b includes an output buffer OBR which is read to the extension bus 19' during a read command (62H) and an input buffer IBR which is written to during a write operation from the extension bus 19' (62H and 66H). The input buffer can serve as a command register and as a data register. A status register SR is provided which includes an Input Buffer Full (IBF) flag and an Output Buffer Full (OBF) flag. The input buffer register IBR and output buffer register OBR interface with the embedded controller portion of the system management controller 31. The status register SR interfaces with the I/O space of the embedded controller.

Figures 4, 4A:
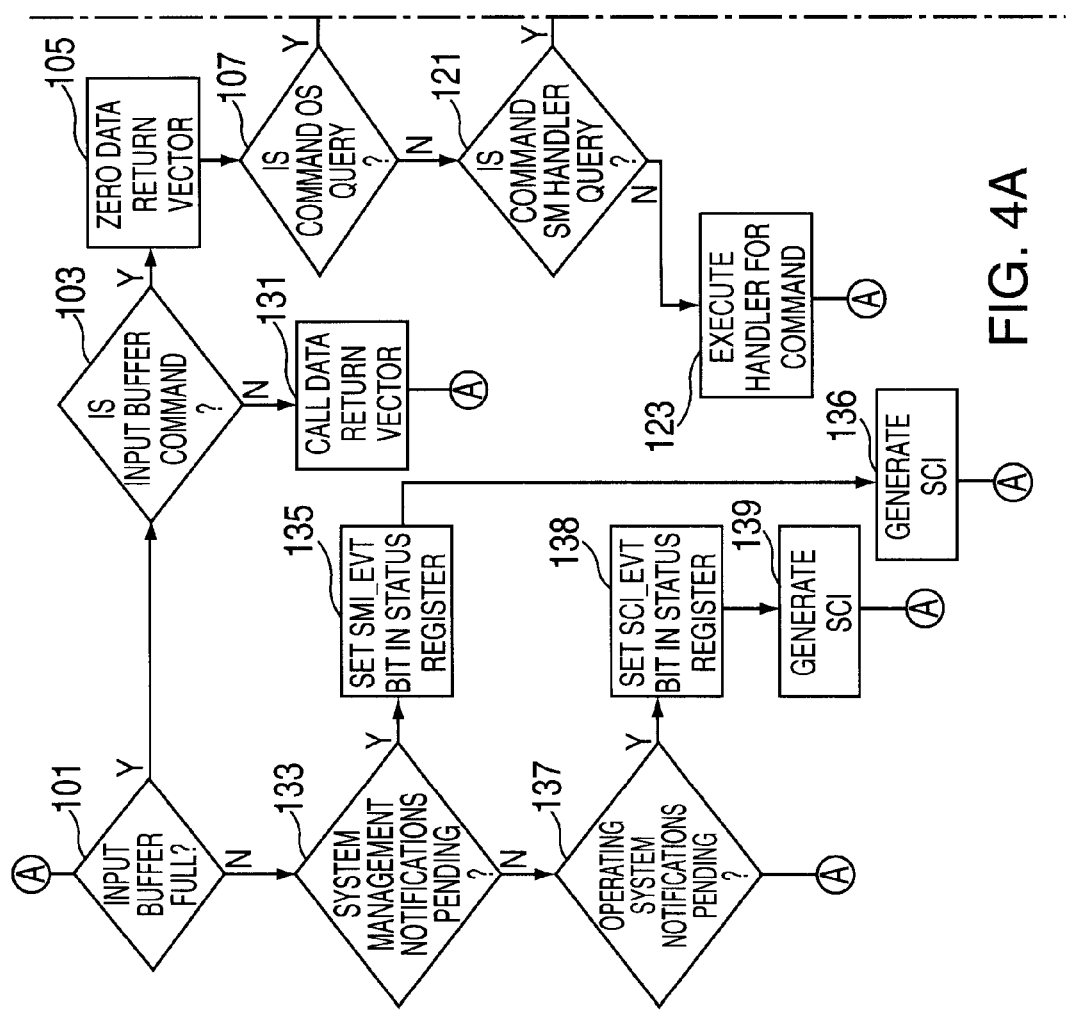
FIG. 4 is a flow diagram of the operation of firmware for operating the embedded controller designed according to the present invention.
Figure 4B:
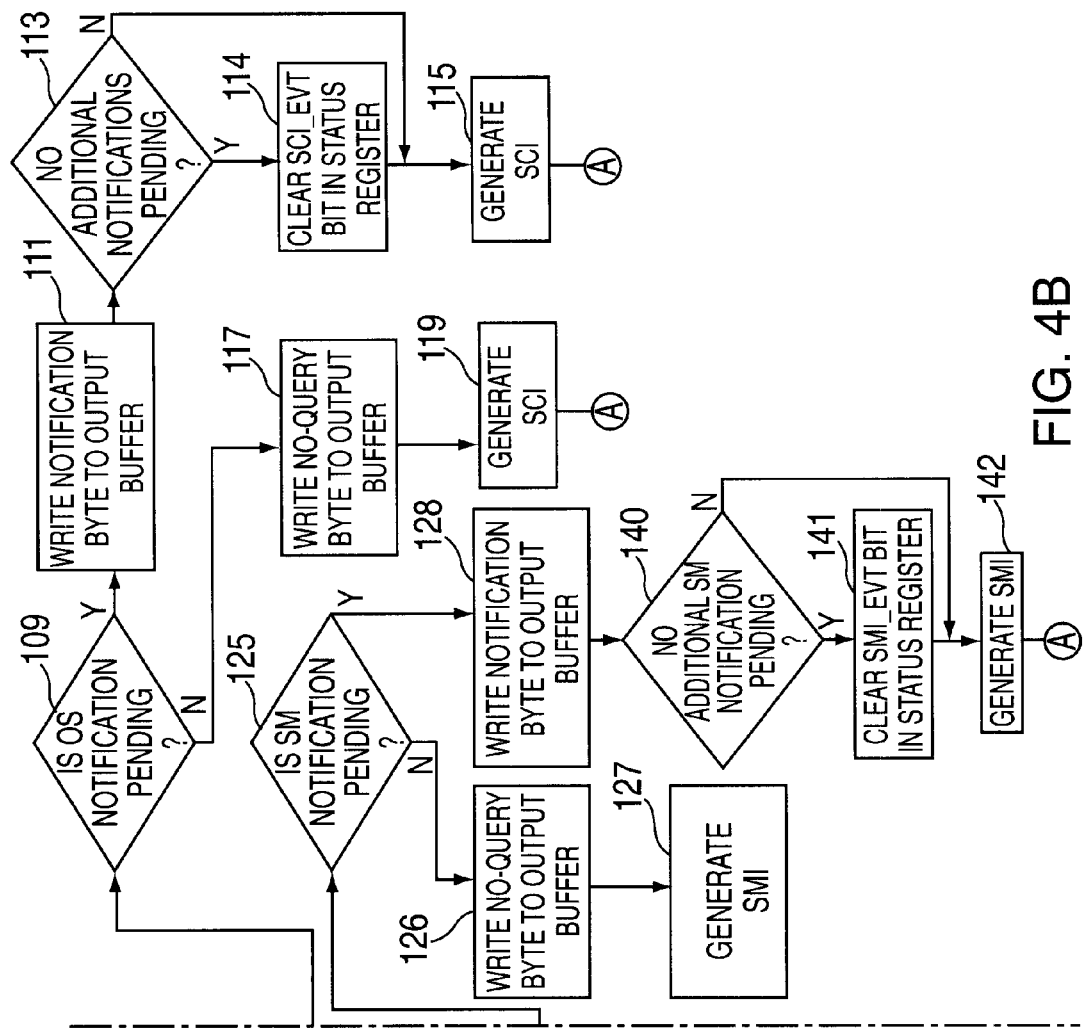

Referring to FIG. 4, the operation of a portion of the firmware for the system management controller 31b is shown in flow diagram form. The design of the firmware is such that it asserts dedicated interrupts to target a processor task directly. There is, however, a possibility of an error occurring if the controller 31 has placed a notification byte (described below) in its output buffer, but has not yet triggered an interrupt. During this time window, an SMI process or an operating system task could gain ownership of the interface and incorrectly receive unintentional data. The firmware is designed so that the embedded controller 31 is always ready to process a new command from the host, regardless of the notification the embedded controller is attempting to send to the host. If the embedded controller sees a command being sent to it, it will abort the initial command notification (and try again later), and process the new command. The embedded controller firmware is also designed so that it knows what interrupt to generate (SCI or SMI) between data sends, system notification events, and data returns.

Returning to FIG. 2, the system management controller 31b can be coupled to a plurality of system devices for monitoring and/or control purposes. For example, a thermal analog-to-digital device 41 can be provided to indicate when temperature in the system 30 or at a particular component exceeds a predetermined threshold. An IDE power plane switch 43 can be provided to control power management (i.e., disconnecting and reconnecting devices to the power plane). Also a System Management bus (SMBus) 45 can be provided which is accessed by the operating system. Typical devices coupled to the SMBus 45 include a smart battery, smart charger, contrast backlight control, and temperature sensors (not shown specifically in FIG. 2). In this embodiment, the system management controller 31b can be responsible for notifying the operating system environment (i.e., the execution of operating system code) or the system management environment (i.e., the execution of system management code) that an event has occurred. For example, the operating system environment could be notified if a battery has been inserted, that a docking event has taken place, or that the battery is almost exhausted. The system management environment could be notified if a function key is depressed which requires a system management operation, or an event has occurred which requires the SM environment to power down or up components in the computer system 30 (e.g., to cause the system management controller 31b to switch a device off from an IDE power plane via switch 43).

There are several methods to insure that only one host processor task is being executed to access the embedded controller interface at a time. One such method is described at Section 5.2.6 (Firmware ACPI Control Structure) of "Advanced Configuration and Power Interface Specification," Draft Revision 1.0, Dec. 22, 1996, by Intel Corporation et alia, the disclosure of which is hereby incorporated by reference. In this example, a storage area is provided (e.g., a third memory area 14'c of memory 14 or memory area 16c' in FIG. 7) such that locked CPU cycles can be used to arbitrate ownership of the system management controller interface. One skilled in the art will appreciate that other memory devices can be used to provide this locking mechanism (e.g., a register). In this example, the physical memory location is used to arbitrate ownership between the SM handler environment and the operating system tasks (that could potentially be running on multiple processors). In a multiprocessor system, the firmware is changed to ensure that only one SM handler executes at a time. Referring to FIG. 6, an example of the information that can be stored in the aforementioned physical memory is shown. A first bit, Bit 1, indicates whether an operating task has ownership of the locking mechanism. A second bit, Bit 0, indicates whether a request for access to the embedded controller interface by another operating task is pending.

The operation of this locking mechanism is described below. When an environment (e.g., an operating system environment or a system management environment) seeks to access the embedded controller interface, it first accesses the locking mechanism to see if the lock is owned (i.e., is Bit 1 set). If Bit 1 is not set, then the environment seeking access sets Bit 1 (e.g., sets it to a 1 value) and proceeds to access the embedded controller. If Bit 1 is already set, then the environment sets Bit 0 to indicate to the environment that controls the embedded controller 31 that access is desired.

Once the environment has finished accessing the embedded controller, that environment should check the locking mechanism to see if the pending bit (Bit 0) is set. If it is set, the environment should indicate that the lock is available to the other environment (e.g., through an interrupt or through the setting of a bit in a memory location accessible by the other operating environment(s)).

Referring back to FIG. 4, the operation of the firmware in the system management controller 31b is described below. Starting in decision block 101, the controller 31b first ascertains whether the input buffer is full by accessing the input buffer full flag IBF. If the input buffer is fill, control passes to decision block 103 to determine if the input buffer contains command or data. As seen in FIG. 5, the status register includes eight bits (two of which are IBF and OBF and two are ignored (IGN)). The CMD bit of the status register is set or cleared by the device accessing the system management controller 31b indicating whether the byte in the data register is a command or data. Additional signals are provided in the status register of FIG. 5. The SCI_EVT bit is set by the embedded controller 31 when it has detected an internal event that requires the operating system's attention. The operating system will, in turn, need this bit to differentiate command complete SCI's from notification SCI's (described below). The SMI_EVT bit is used by the system management handler in a similar manner. The BURST bit indicates that the embedded controller has received the burst enable command from the operating system, has halted normal processing, and is waiting for a series of commands to be sent from the operating system. This allows the operating system to quickly read and write several bytes of data at a time without the overhead of SCI's between the commands.

Returning to FIG. 4, there are several commands that can be received by the embedded controller 31 that will result in the exchange of data between the embedded controller 31 and the CPU 11'. A read embedded controller command allows the operating system to read a byte in the address space of the embedded controller. Such a command indicates to the embedded controller to generate SCI's in response to related transactions rather than SMIs. After this command byte is written to the Status Register and then an address byte written to the input buffer. In response, the embedded controller will return the requested data byte in the output buffer which sets the OBF flag.

A write embedded controller command allows the operating system to write a byte into the addressable space of the embedded controller. In a manner similar to that of the read operation described above, the write command indicates to the embedded controller 31 to generate SCI's in response to related transactions rather than SMIs. A command byte is written to the status register SR followed by an address byte being written to the input buffer of the embedded controller, followed by the data byte to be written at the addressed location.

A burst enable embedded controller command allows the OS to request control of the embedded controller and prevent the embedded controller from doing other tasks except receiving commands and data from the component making the request. Accordingly, a burst disable embedded controller command is provided allowing the same component to allow the embedded controller to resume normal processing.

A query command is provided which allows the OS to query the embedded controller for the cause of the last received SCI. This command signals to the embedded controller that the OS has sole ownership of the interface and as a result, the OS and the embedded controller can communicate without being overwritten by the system SM handler attempting to use the interface. When the embedded controller has detected a system event that must be communicated to the OS, it will first generate an SCI and then wait for the OS to send the query command. After the OS sends the query command, the embedded controller will place a notification byte in the output buffer indicating the cause of the SCI. Similar commands can be provided for the system management environment as well.

Returning to FIG. 4, if a command has been received at the input buffer, control passes to block 105 where the input buffer is cleared (thus clearing the IBF flag). If the command is an OS query command as described above (decision block 107), then control passes to decision block 109 to determine if any OS notifications are pending to be sent to the OS. If there is a notification pending, then control passes to block 111 where the notification byte is written to the output buffer. Control passes to decision block 113 to check to see if any additional OS notifications are pending. If there are additional notifications pending, an SCI interrupt is generated (block 115) to the OS to indicate that the notification byte is in the output buffer (i.e., the expected response to the query command). If there are no additional notifications for the OS, the SCI_EVT bit in the status register is cleared (block 114) before the SCI interrupt is generated.

Returning to decision block 109, if an OS notification is not pending, then an error has occurred in sending the query command to the embedded controller. Accordingly, a no-query byte is placed in the output buffer indicating that error (block 117) and an SCI interrupt is generated (block 119). Returning to decision block 107, if the command is not an OS query command, then control passes to decision block 121 where it is determined whether the command is a System Management handler query command. If it is not an SM handler query command, control passes to block 123 for execution of the SM handler command in a known manner. If the command is an SM handler query, control passes to decision block 125 to determine if an SM notification is pending in the embedded controller. If one is not, then an error has occurred and a no-query byte is placed in the output buffer (block 126) and an SMI interrupt is generated (block 127) to let the SM handler know that an error had occurred in issuing the query command. If an SM notification is pending in the embedded controller, control passes to block 128 where the notification byte is written to the output buffer. If additional system management notifications are not pending (decision block 140) then control passes to block 141 to clear the SMI_EVT status bit (indicating no further notifications are pending). In either event, an SMI is generated (block 142) to let the system management environment know that a notification byte is prepared to be read.

Returning to decision block 103, if the input buffer contains data rather than a command, control passes to block 131 where the data is stored in the appropriate location in the embedded controller. Also, returning to decision block 101, when the input buffer is not full, the embedded controller checks to make sure that no notifications are pending for the OS or SM handler. Thus, in decision block 133, if a System Management notification is pending, the SMI_EVT bit is set (block 135) and an SMI is generated (block 136) which will elicit a SM handler query command. In decision block 137, if an OS notification is pending, then the then the SCI_EVT bit is set in the status register (block 138) and an SCI interrupt is generated (block 139) which will elicit an OS Query command.

To summarize the above described embodiment of the operation of the operating system and system management handler environments and the system management controller 31b can be shown by example. The general sequence of steps to send a command to the embedded controller is as follows:

1. Acquire the locking mechanism (FIG. 6).
2. Verify that the IBF flag is not set (FIG. 3).
3. Write a Burst Enable Embedded Controller command to the command register.
4. Wait for SM controller 31b to send an interrupt.
5. Verify that lock was granted (i.e., check to see if BURST bit is set).
6. Write command to command register.
7. Ensure IBF flag is low.
8. Write data byte to data register.
9. Ensure IBF flag is low.
10. Write data byte to data register.
11. Ensure IBF flag is low.
12. Repeat step 7–11 to send additional bytes.
13. Write Burst Disable Embedded Controller command to command register.
14. Release locking mechanism.

The following is the general sequence for receiving information from the SM controller 31b:

1. Embedded controller interrupt received (reason unknown).
2. Acquire locking mechanism.
3. Ensure IBF flag is low.
4. Write Query command to SM controller.
5. Wait for SM controller to send interrupt.
6. Ensure OBF flag is high.
7. Read Query result from data register.
8. Process result.
9. Release locking mechanism.

To insure that the information retrieved from the system management controller is intended for the environment accessing the controller 31b, the appropriate status line should be checked by that environment before retrieving the information (e.g., before the operating system environment retrieves information from the system management controller, the value EC_SCI_STS (FIG. 3) is checked to make sure that the controller 31b has issued an SCI interrupt). In summary an improved embedded controller design has been described above where the interface of the embedded controller is shared between two or more environments such as an operating system environment and a system management environment, thus improving the performance of a computer system.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A computer system comprising:
   a central processing unit adapted to execute operating system code stored in a first memory area and to execute system management code stored in a second memory area;
   an embedded controller including a host interface coupled to said central processing unit; a first interrupt output coupled to said central processing unit, said first interrupt output initiates execution of operating system code in said central processing unit and a second interrupt output coupled to said central processing unit, said second interrupt output initiates execution of system management code in said central processing unit; and
   said embedded controller coupled to at least one system device in said computer system, said central processing unit and said embedded controller communicating via said host interface and said first and second interrupt outputs such that said central processing unit is capable of at least one of monitoring and controlling said system device via said embedded controller during execution of at least one of said operating system code and said system management code.

2. The computer system of claim 1 wherein said central processing unit is executing operating system code and communicates with said embedded controller by: writing command information to a command register of said embedded controller; receiving the first interrupt from said embedded controller at said processing unit; and exchanging data between said embedded controller and said processing unit while executing operating system code.

3. The computer system of claim 1 wherein said central processing unit is executing system management code and communicates with said embedded controller by writing command information to a command register of said embedded controller; receiving the second interrupt from said embedded controller at said processing unit and exchanging data between said embedded controller and said processing unit while executing system management code.

4. The computer system of claim 1, further comprising:
an additional embedded controller including an additional host interface coupled to said central processing unit; a first interrupt output coupled to said central processing unit, said first interrupt output initiates execution of operating system code in said central processing unit; and a second interrupt output coupled to said central processing unit, said second interrupt output initiates execution of system management code in said central processing unit; and
said additional embedded controller coupled to at least one additional system device in said computer system, said central processing unit and said embedded controller communicating via said additional host interface and said first and second interrupt outputs such that said central processing unit is capable of at least one of monitoring and controlling said additional system device via said additional embedded controller during execution of at least one of said operating system code and said system management code.

5. A computer system comprising:
a first processing unit adapted to execute operating system code stored in a first memory area;
a second processing unit adapted to execute system management code stored in a second memory area;
an embedded controller including
a host interface coupled to each of said first and second processing units;
a first interrupt output coupled to at least said first processing unit, said first interrupt output initiates execution of operating system code in said first processing unit; and
a second interrupt output coupled to at least said second processing unit, said second interrupt output initiates execution of system management code in said second processing unit; and
said embedded controller coupled to at least one system device in said computer system, said first and second processing units and said embedded controller communicating via said host interface and said first and second interrupt outputs, such that said each of said processing units is capable of at least one of monitoring and controlling said system device via said embedded controller during execution of at least one of said operating system code and said system management code.

6. The computer system of claim 5 wherein said first processing unit is executing operating system code and communicates with said embedded controller by: writing command information to a command register of said embedded controller; receiving the first interrupt from said embedded controller at said first processing unit and exchanging data between said embedded controller and said first processing unit while executing operating system code.

7. The computer system of claim 5 wherein said second processing unit is executing system management code and communicates with said embedded controller by: writing command information to a command register of said embedded controller; receiving the second interrupt from said embedded controller at said first processing unit; and communicating with said embedded controller by said second processing unit while executing system management code.

8. The computer system of claim 5, further comprising:
an additional embedded controller including
an additional host interface coupled to each of said first and second processing units;
a first interrupt output coupled to at least said first processing unit, said first interrupt output initiates execution of operating system code in said first processing unit; and
a second interrupt output coupled to at least said second processing unit, said second interrupt output initiates execution of system management code in said second processing unit; and
said additional embedded controller coupled to at least one additional system device in said computer system, said first and second processing units and said additional embedded controller communicating via said additional host interface and said first and second interrupts, such that each of said processing units is capable of at least one of monitoring and controlling said additional system device via said embedded controller during execution of at least one of said operating system code and said system management code.

9. A method of operating a computer system including a central processing unit and an embedded controller coupled to said central processing unit via a host interface and at least one system device coupled to said embedded controller, comprising:
executing operating system code stored in a first memory area by the central processing unit;
executing system management code stored in a second memory area by said central processing unit;
outputting a first interrupt from said embedded controller to said central processing unit, said first interrupt initiating execution of operating system code in said central processing unit;
outputting a second interrupt from said embedded controller to said central processing unit, said second interrupt initiating execution of operating system code in said central processing unit; and
communicating between said central processing unit and said embedded controller via said host interface and said first and second interrupts such that said central processing unit is capable of at least one of monitoring and controlling said system device via said embedded controller during execution of at least one of said operating system code and said system management code.

10. The method of claim 9 wherein said communicating step further includes:
writing command information to a command register of said embedded controller by said processing unit;
receiving the first interrupt from said embedded controller at said processing unit; and
exchanging data between said embedded controller and said processing unit executing operating system code.

11. The method of claim 9 further comprising:
determining whether said command register contains command information;
placing notification information of said system device in an output buffer of said host interface by said embedded controller if said command register does not contain command information;

receiving the first interrupt from said embedded controller at said processing unit; and transferring said notification information from said embedded controller to said processing unit executing operating system code.

12. The method of claim 9 wherein said communicating step further includes:

writing command information to a command register of said embedded controller by said processing unit;

receiving the second interrupt from said embedded controller at said processing unit; and exchanging data between said embedded controller and said processing unit executing system management code.

13. The method of claim 9 further comprising:

determining whether said command register contains command information;

placing notification information of said system device in an output buffer of said host interface by said embedded controller if said command register does not contain command information;

receiving the second interrupt from said embedded controller at said processing unit; and transferring said notification data from said embedded controller to said processing unit executing system management code.

14. A method of operating a computer system including at least first and second processing units and an embedded controller coupled to said processing units via a host interface and at least one system device coupled to said embedded controller, comprising:

executing operating system code stored in a first memory area by the first processing unit;

executing system management code stored in a second memory area by the second processing unit;

outputting a first interrupt from said embedded controller to said first processing unit, said first interrupt initiating execution of operating system code in said first processing unit;

outputting a second interrupt from said embedded controller to said second processing unit, said second interrupt initiating execution of system management code in said second processing unit; and communicating between said processing units and said embedded controller via said host interface and said first and second interrupts such that said processing units are capable of at least one of monitoring and controlling said system device via said embedded controller during execution of at least one of said operating system code and said system management code.

15. The method of claim 14 wherein said communicating step further includes:

writing command information to a command register of said embedded controller by said first processing unit;

receiving the first interrupt from said embedded controller at said first processing unit; and exchanging data between said embedded controller and said first processing unit executing operating system code.

16. The method of claim 14 further comprising:

determining whether said command register contains command information;

placing notification information of said system device in an output buffer of said host interface by said embedded controller if said command register does not contain command information;

receiving the first interrupt from said embedded controller at said first processing unit; and transferring said notification information from said embedded controller to said first processing unit executing operating system code.

17. The method of claim 14 wherein said communicating step further includes:

writing command information to a command register of said embedded controller by said second processing unit;

receiving the second interrupt from said embedded controller at said second processing unit; and exchanging data between said embedded controller and said second processing unit executing system management code.

18. The method of claim 14 further comprising:

determining whether said command register contains command information;

placing notification information of said system device in an output buffer of said host interface by said embedded controller if said command register does not contain command information;

receiving the second interrupt from said embedded controller at said second processing unit; and transferring said notification data from said embedded controller to said second processing unit executing system management code.

* * * * *